US010153650B2

(12) United States Patent
Ni Scanaill et al.

(10) Patent No.: US 10,153,650 B2
(45) Date of Patent: Dec. 11, 2018

(54) ENERGY HARVESTING SYSTEM FOR IOT DEVICES

(71) Applicant: Intel Corporation, Santa Clara, CA (US)

(72) Inventors: Cliodhna Ni Scanaill, Broadford (IE); Mark Kelly, Dublin (IE); Keith Nolan, Mullingar (IE); Aurelian Lazarut, Athy (IE)

(73) Assignee: Intel Corporation, Santa Clara, CA (US)

( * ) Notice: Subject to any disclaimer, the term of this patent is extended or adjusted under 35 U.S.C. 154(b) by 234 days.

(21) Appl. No.: 14/969,925

(22) Filed: Dec. 15, 2015

(65) Prior Publication Data

US 2017/0170675 A1  Jun. 15, 2017

(51) Int. Cl.
*H02J 1/12* (2006.01)
*H02J 7/00* (2006.01)
*H02J 7/34* (2006.01)

(52) U.S. Cl.
CPC ............ *H02J 7/0068* (2013.01); *H02J 7/007* (2013.01); *H02J 7/008* (2013.01); *H02J 7/0063* (2013.01); *H02J 7/34* (2013.01); *H02J 7/345* (2013.01); *H02J 2007/0067* (2013.01)

(58) Field of Classification Search
CPC .. H02J 7/0068; H02J 7/007; H02J 7/34; H02J 7/345; H02J 7/0063; H02J 7/008; H02J 2007/0067
USPC .......................................................... 307/21
See application file for complete search history.

(56) References Cited

U.S. PATENT DOCUMENTS

| | | | | |
|---|---|---|---|---|
| 5,747,890 | A | * | 5/1998 | Yin .......................... H02J 9/061 307/64 |
| 2004/0232878 | A1 | | 11/2004 | Couch et al. |
| 2006/0133007 | A1 | * | 6/2006 | Shiue ........................ H02P 7/04 361/301.2 |
| 2008/0238194 | A1 | * | 10/2008 | Treguer ................ H02J 7/1423 307/10.1 |
| 2010/0039062 | A1 | | 2/2010 | Gu et al. |
| 2011/0111811 | A1 | * | 5/2011 | Juang ......................... G06F 1/26 455/573 |
| 2011/0309145 | A1 | | 12/2011 | Richardson |
| 2012/0068669 | A1 | | 3/2012 | Trainor |
| 2012/0099392 | A1 | * | 4/2012 | Shim ...................... G11C 5/147 365/226 |
| 2014/0005846 | A1 | * | 1/2014 | Boo ........................ G05B 13/02 700/291 |

(Continued)

OTHER PUBLICATIONS

"International Application Serial No. PCT/US2016/060620, International Search Report dated Feb. 20, 2017", 3 pgs.

(Continued)

*Primary Examiner* — Richard Tan
(74) *Attorney, Agent, or Firm* — Schwegman Lundberg & Woessner, P.A.

(57) ABSTRACT

A system and related methods for powering a device module of IoT device with an energy harvesting module. A supercapacitor is charged by the energy harvesting module and discharged to the device module to power the device module. The discharge from the supercapacitor may be scheduled to power demanding tasks to provide sufficient recharging periods for the supercapacitor and avoid discharging the supercapacitor when the supercapacitor is insufficiently charged.

16 Claims, 12 Drawing Sheets

(56) References Cited

U.S. PATENT DOCUMENTS

2014/0103855 A1     4/2014  Wolter
2017/0150448 A1*    5/2017  Stagg ................ H04W 52/0261

OTHER PUBLICATIONS

"International Application Serial No. PCT/US2016/060620, Written Opinion dated Feb. 20, 2017", 8 pgs.

Bogue, Robert, "Energy harvesting and wireless sensors: a review of recent developments", Sensor Review Emerald Group Publishing Limited 29/3, (2009), 194-199.

Chang, Hyung-Kwan, et al., "Design and Analysis of Portable Loadless Wind Power Source for Ubiquitous Sensor Network", IEEE vol. 5 Dept. Mechanical engineering Sogang UniversitySeoul, South Korea, (2010), 93-96.

Chao, Paul C.-P., "Energy Harvesting Electronics for Vibratory Devices in Self-Powered Sensors", IEEE Sensors Journal, vol. 11, No. 12,, (2011), 3106-3121.

Georgiadis, Apostolos, et al., "Flexible Hybrid Solar/EM Energy Harvester for Autonomous Sensors", Centre Tecnologic de Telecomunicacions de Catalunya (CTTC), Castelldefels, Barcelona, 08860, Spain, (2011), 4 pgs.

Mitcheson, Paul D, "Energy Harvesting for Human Wearable and Implantable Bio-Sensors", 32nd Annual International Conference of the IEEE EMBS Buenos Aires, Argentina, (2010), 5 pgs.

Nechibvute, Action, et al., "Piezoelectric Energy Harvesting Devices: An Alternative Energy Source forWireless Sensors", Hindawi Publishing Corporation Smart Materials Researchvol. 2012, Article ID 853481, doi:10.1155/2012/853481, (2012), 14 pgs.

Penella, M, et al., "A Review of Commercial Energy Harvesters for Autonomous Sensors", IEEE Instrumentation Measurement Technology Conference IMTC 2007, (2007), 5 pgs.

Romero, E, et al., "Energy scavenging sources for biomedical sensors", IOP Publishing Physiological MeasurementPhysiol. Meas. 30 R35-R62 doi:10.1088/0967-3334/30/9/R01, (2009), 29 pgs.

Schroder, C, et al., "ALN-Based Piezoelectric Micropower Generator for Low Ambient Vibration Energy Harvesting", Fraunhofer Institute for Silicon Technology ISIT, Itzehoe, Germany, 4 pgs.

* cited by examiner

ENERGY HARVESTING SYSTEM FOR IOT DEVICES

TECHNICAL FIELD

This document pertains generally, but not by way of limitation, to energy harvesting systems and related methods for powering Internet of Things ("IoT") devices.

BACKGROUND

Many IoT devices can be configured for monitoring or other functions in remote geographic locations or other locations where the IoT device cannot be powered by a power grid. These IoT devices can be powered by self-contained power sources that typically include batteries for powering the sensors, transmitters, receivers, and other device modules of the IoT device. Recently, energy harvesters, such as solar panels and wind turbines, have been integrated into IoT devices to continually recharge the batteries of the IoT device if the batteries are depleted from powering the device modules. While the energy harvesters permit recharging of discharged batteries, the rechargeable batteries still require regular maintenance and replacement hampering the effectiveness of the IoT device. The continual and repeated recharging of the chemical batteries gradually reduces the effective charge that can be received by the batteries and eventually require that no longer effective batteries to be replaced. In addition, certain IoT devices regularly perform tasks requiring substantial power discharges, such as long range and substantial data or message transmissions, which further reduces the effectiveness of the batteries over time.

As the ineffective batteries must often be replaced within the overall life of the IoT device, the IoT device is constructed with an access panel or other doorway to permit access to the batteries. However, the access point can also permit moisture and other contaminants to penetrate the interior of the IoT device and damage the device. As these types of IoT devices are often placed in locations with harsh and/or turbulent weather for providing monitoring of those locations, the IoT devices are often subjected to inclement weather and other situations, such as flooding, which could exploit the battery replacement access panel and cause moisture or containments to penetrate the IoT device.

Similarly, chemical batteries are vulnerable to reduced effectiveness when subjected to extreme cold or warm temperatures and/or at high attitudes. As such, insulation or other special precautions to prevent reduced effectiveness or failure of the IoT device due to insufficient power provided by the batteries. The added precautions increase the expense and complexity of the IoT device. In addition, heating or cooling systems will further drain the battery and reduce the overall effectiveness of the IoT device.

As such, powering the IoT device with the battery significantly hinders the longevity of the MT device and increases the maintenance required by the IoT device.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DESCRIPTION OF EMBODIMENTS

Figure 1A:
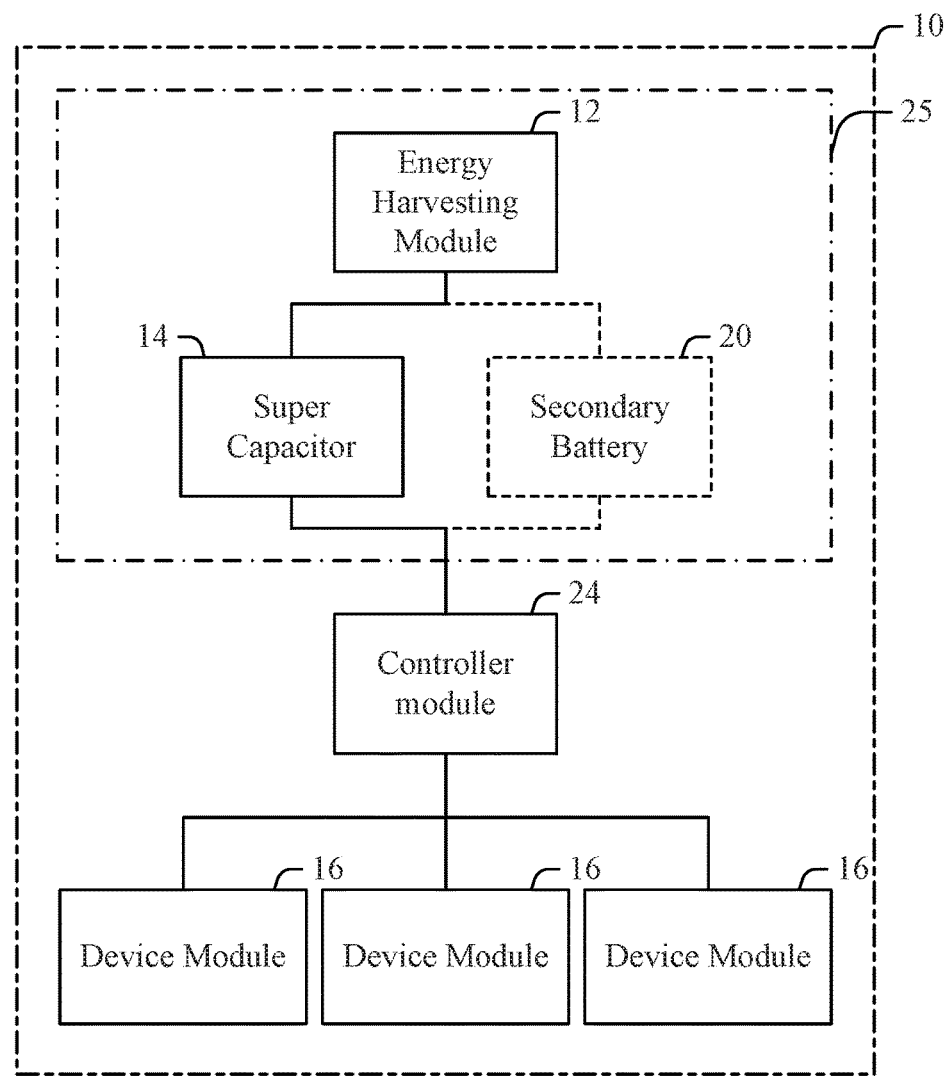
FIG. 1A is a schematic diagram of an IoT device according to an example of the present disclosure in which an energy harvesting module is integral to the IoT device.

The present inventors have recognized, among other things, that a problem to be solved can include the increased maintenance and gradually reducing effectiveness of IoT devices resulting from the use of batteries as the primary or sole power source for IoT devices. In an example, the present subject matter can provide a solution to this problem, such as by providing an IoT device that may have a supercapacitor powering a device module and an energy harvesting module for recharging the supercapacitor. As the device module is powered by the discharge of the supercapacitor, the IoT device may be energy source agnostic and the energy harvesting module may be selected according to the most readily available energy source.

The energy harvesting module may continuously charge or regularly recharge the supercapacitor without gradually reducing charge capacity as with conventional chemical batteries. Similarly, the supercapacitor may be repeatedly fully discharged without impacting the overall charge capacity of the supercapacitor. In addition, the supercapacitor is less susceptible to reduced performance or damage from extreme temperatures then chemical batteries. As such, regular replacement of the battery may be avoided thereby permitting a more complete sealing of the IoT device against moisture and contaminants.

In an example, the IoT device may be configured to evaluate energy consumption of the device module during an initial training period. During the initial training period, a controller may evaluate energy demanding tasks for the device module and power harvesting by the power harvesting module. The controller may alter the queue of tasks to schedule the tasks to align with power harvesting windows such that the supercapacitor is continually recharged by the power harvesting module as the supercapacitor is discharged. This configuration may also schedule the energy demand task when energy source for the power harvesting module is more abundant.

In an example, the training period can correspond to the rated lifetime of the secondary battery. In at least one example, the training period can last at least one year to allow the controller to understand diurnal, seasonal and annual variations in energy availability and consumption to adapt accordingly. For example, less solar energy is available during the shorter daylight hours of winter than during the longer daylight hours of summer. In contrast, more wind may be available during winter storms that calmer summer days. The controller may alter the queue of tasks to execute energy demanding tasks following a period of supercapacitor recharging to maximize the harvesting of available energy. In an example, the controller may alter the queue of tasks to operate the IoT device to minimize energy consumption and energy demanding tasks until a charging period for the supercapacitor can be scheduled.

In an example, the IoT device may include a hybrid power circuit including a supercapacitor and a secondary battery arranged in parallel to discharge power to the device module. The hybrid power circuit may be biased such that the supercapacitor is the primary power source for the device module and draws power from the secondary battery when the supercapacitor is depleted. In an example, during high energy demanding tasks such as transmission of information, the supercapacitor may initially power the device module and the secondary battery may power the device module when the supercapacitor is depleted. The controller may schedule energy demanding tasks to align with power harvesting windows such that the supercapacitor is continually recharged by the power harvesting module as the supercapacitor is discharged to avoid discharging the secondary battery. The controller may alter the queue of tasks to execute energy demanding tasks following a period of super capacitor recharging to maximize the harvesting of available energy and minimize use of the secondary battery. In an example, the controller may alter the queue of tasks to operate the IoT device to minimize energy consumption and energy demanding tasks until the supercapacitor can be recharged. As the secondary battery supplements the supercapacitor rather than operating as the primary power source, the secondary battery is discharged and recharged less frequently thereby extending the functional life of the battery and/or avoiding the reduced effective charge resulting from repeated recharging of the battery.

As depicted in FIGS. 1A to 1D, an IoT device 10, according to an example, may include an energy harvesting module 12, at least one supercapacitor 14 and at least one device module 16. The energy harvesting module 12 may be operably connected to the supercapacitor 14 for charging the supercapacitor 14, which is operably connected to each device module 16 for discharging power to each device module 16. In an example, a controller module 24 may be configured to control power distribution from the supercapacitor 14 to each device module 16. As depicted in FIGS. 2A-2C, in an example, an IC Boost may step up the voltage outputted by the energy harvesting module 12 to the supercapacitor 14.

Figure 2A:
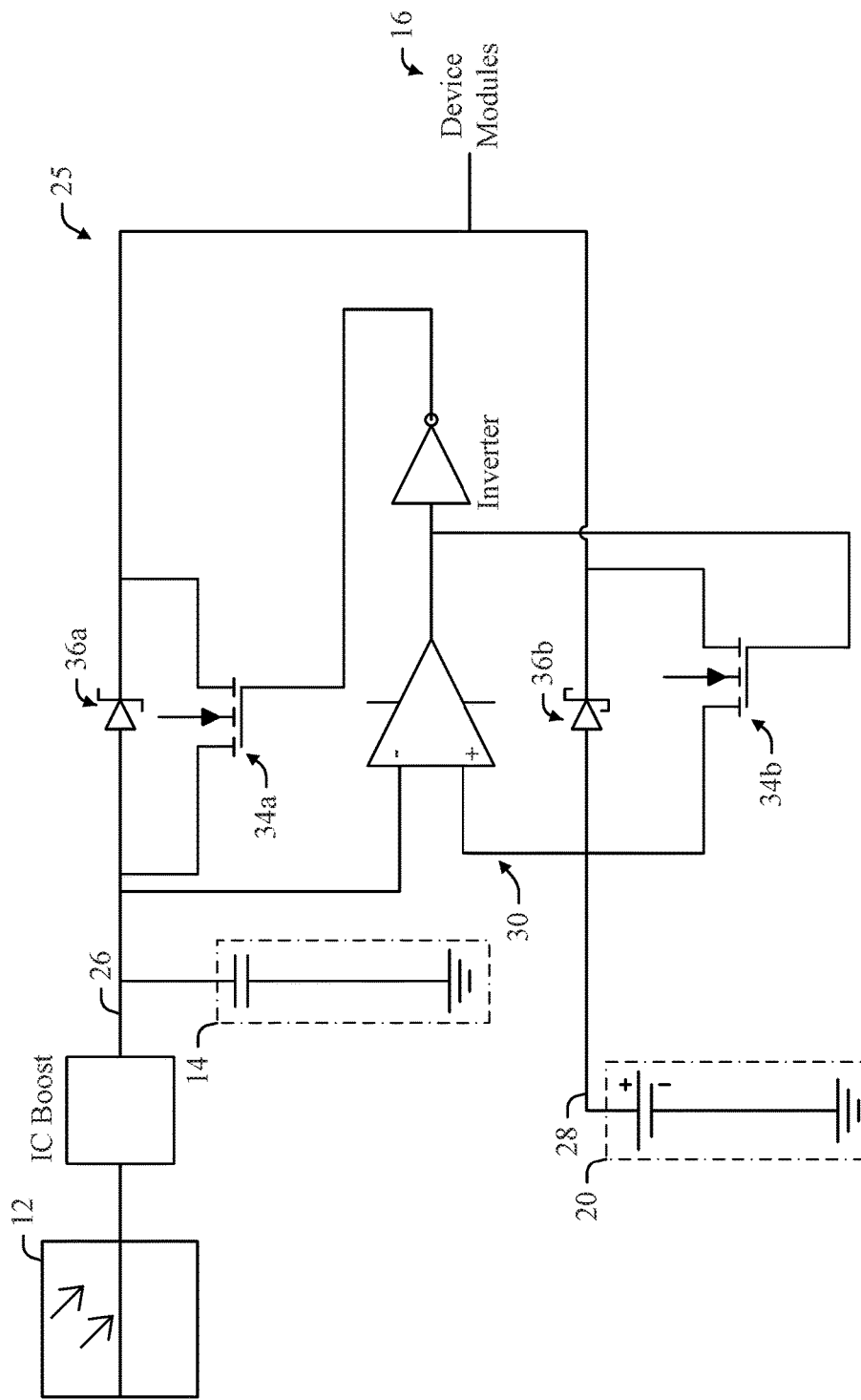
FIG. 2A is circuit diagram of a hybrid power circuit according to an example of the present disclosure.
Figure 2B:
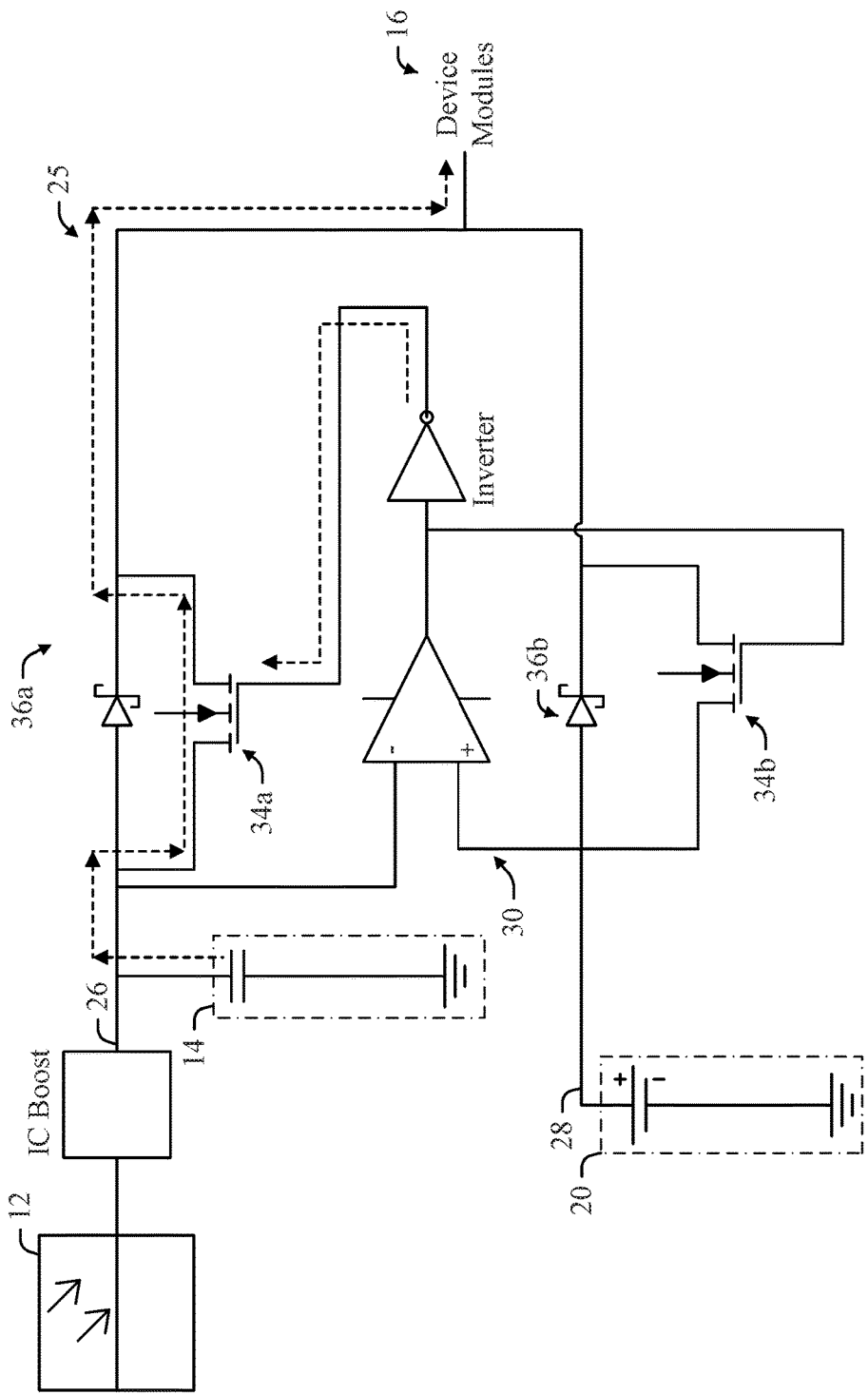
FIG. 2B is a circuit diagram of the hybrid power circuit depicted in FIG. 2A, wherein power is being discharged from the supercapacitor when the supercapacitor has a higher voltage than the battery.
Figure 2C:
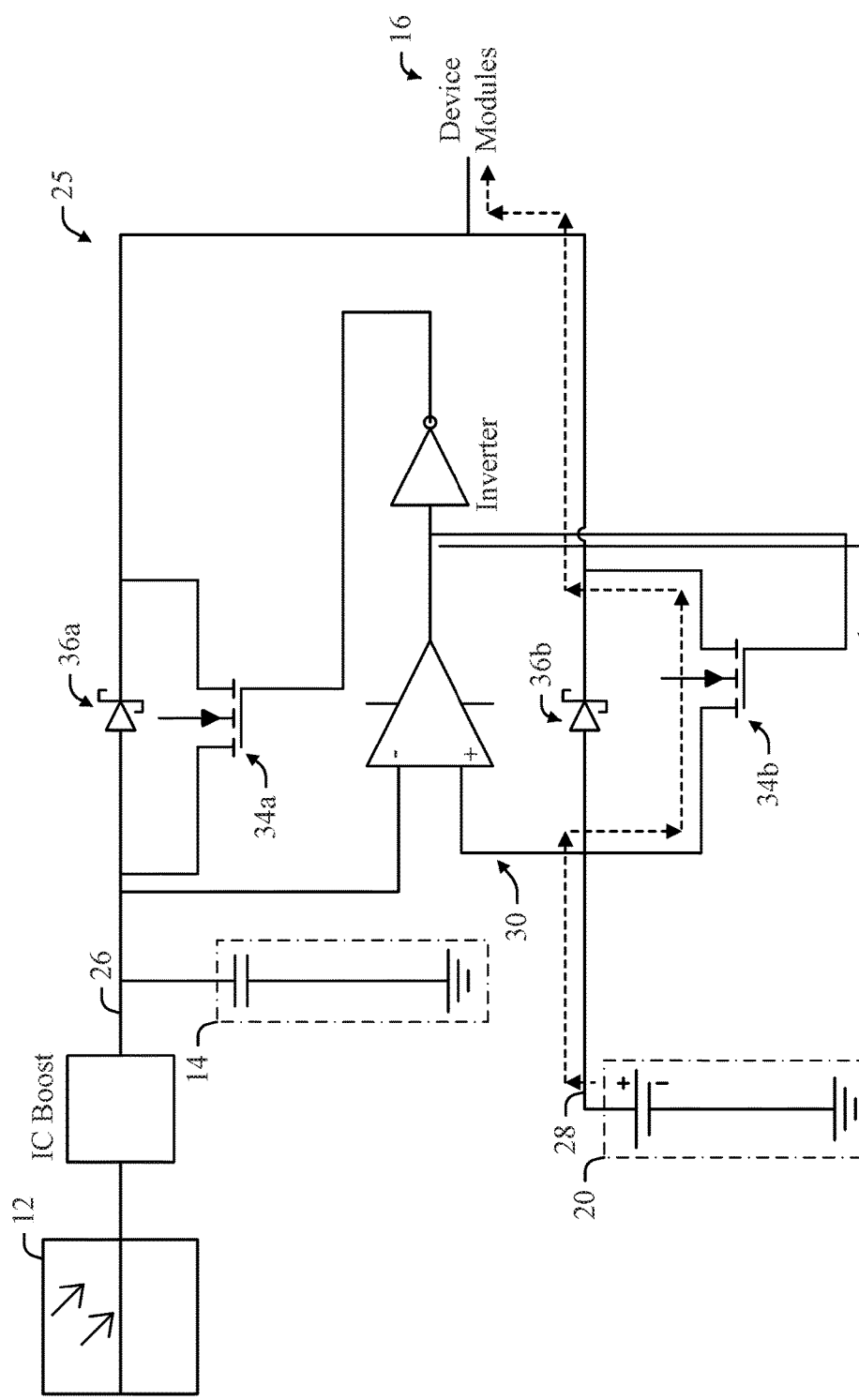
FIG. 2C is a circuit diagram of the hybrid power circuit depicted in FIG. 2A, wherein power is being discharged from the secondary battery.

In an example, the energy harvesting module 12 may be integrated into the IoT device 10 as depicted in FIG. 1A. In this configuration, the IoT device 10 can be self-contained and sealed to minimize potential entry points into the IoT device 10. In at least one example, the IoT device 10 may be mounted to an existing power grid or other energy harvesting devices in a parasitic fashion such that the energy harvesting module 12 draws power from the power grid or other energy harvesting devices to charge the supercapacitor 14.

Figure 1B:
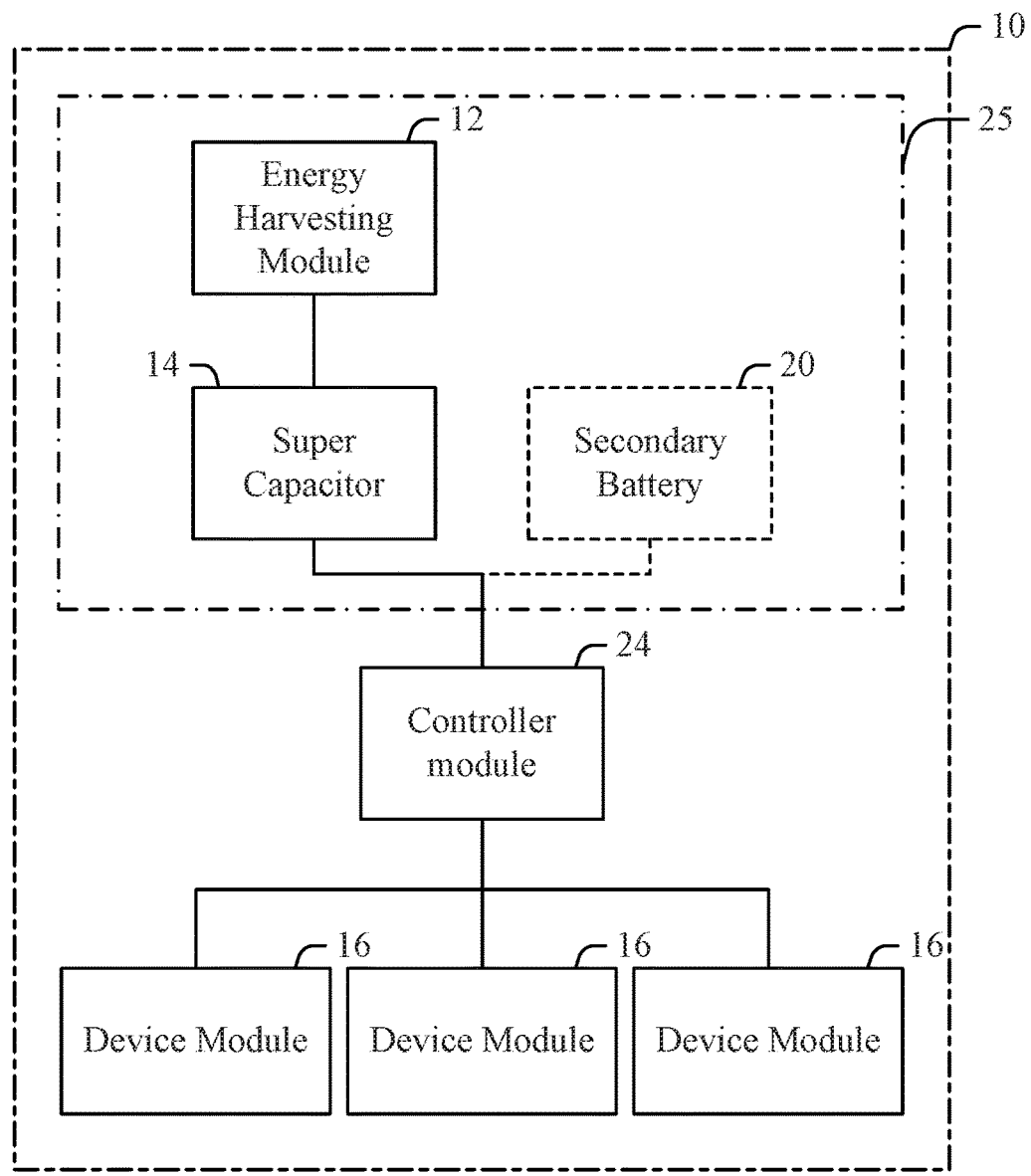
FIG. 1B is a schematic diagram of an IoT device according to an example of the present disclosure having a supercapacitor rechargeable by an energy harvesting module and a non-rechargeable secondary battery.
Figure 1C:
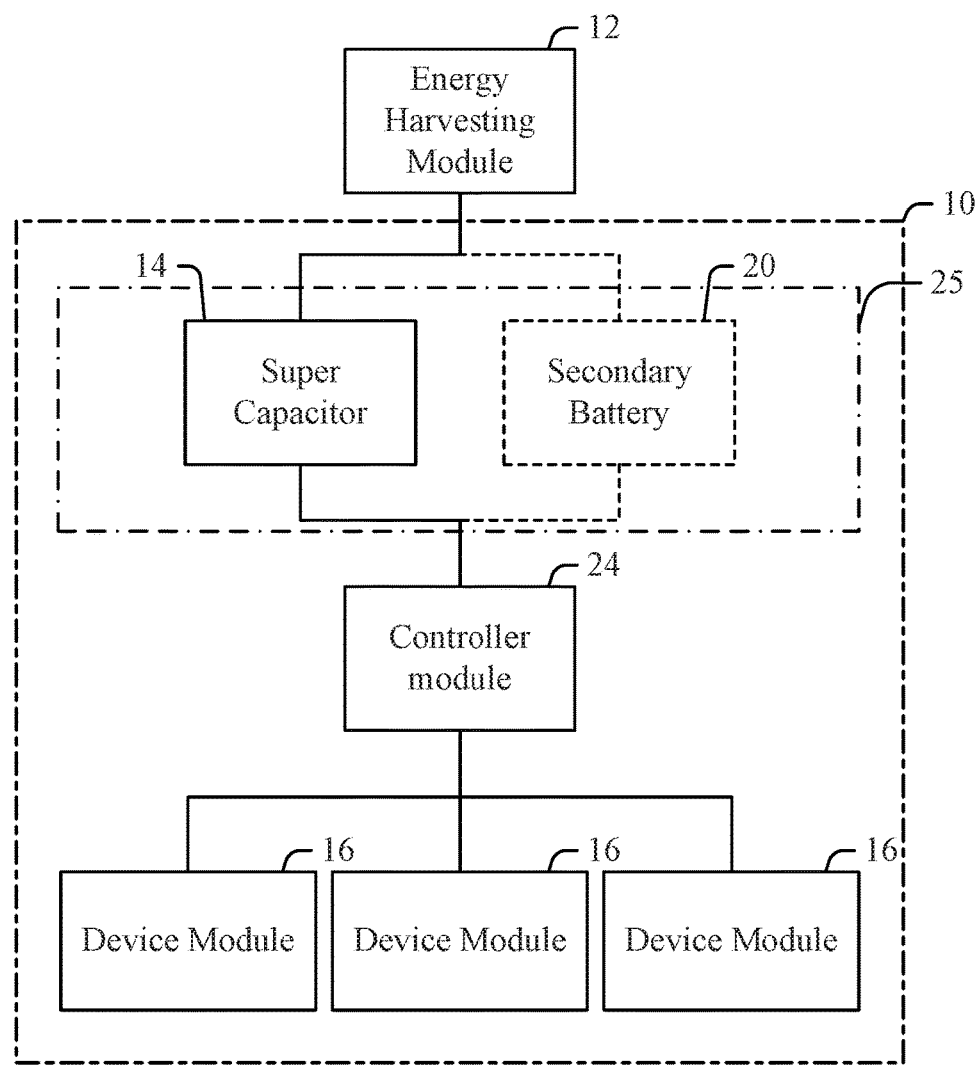
FIG. 1C is a schematic diagram of an IoT device according to an example of the present disclosure in which an energy harvesting module is remote from a supercapacitor of the IoT device.

In an example, as depicted in FIG. 1C, the energy harvesting module 12 may be remote from the supercapacitor 14, wherein the energy harvesting module 12 may be electrically connected to the supercapacitor 14 to charge the supercapacitor 14. In this configuration, the energy harvesting module 12 may be larger than an integrated energy harvesting module 12, thereby permitting gathering of energy from certain ambient energy sources that could require a larger energy gathering module 12 including, but not limited to, solar, microwave, wind, water, and geothermal. Alternatively, in at least one example, the remotely positioned energy harvesting module 12 may be configured to draw from a power grid or other energy harvesting devices in a parasitic fashion to charge the supercapacitor 14.

In at least one example, the energy harvesting module 12 may be configured to convert into electrical energy at least one of, but not limited, mechanical motion, kinetic inductance, electromagnetic inductance, thermal energy, ambient temperature change, and electromagnetic radiation provided by ambient sources. The ambient sources can include, but are not limited to, solar energy, wind energy, tidal or hydroelectric energy, geothermal energy, hydro or air temperature change energy, magnetic energy, and nuclear energy.

In at least one example, the energy harvesting module 12 may be configured to generate electrical energy from a consumable fuel source. The fuel source may include, but is not limited to gasoline, diesel, natural gas, ethanol, coal, nuclear, biomass, salt, sand, and synthetic fuels. The energy harvesting module 12 may be configured to kinetic energy provided by a user to allow manual charging of the IoT device 10 as needed.

In at least one example, the energy harvesting module 12 may be configured to parasitically draw electricity from an existing electrical source including, but not limited to, an existing power grid or other energy harvesting or generators. In this configuration, the IoT device 10 can include a converter for varying the electricity drawn from the existing electrical source.

Figure 1D:
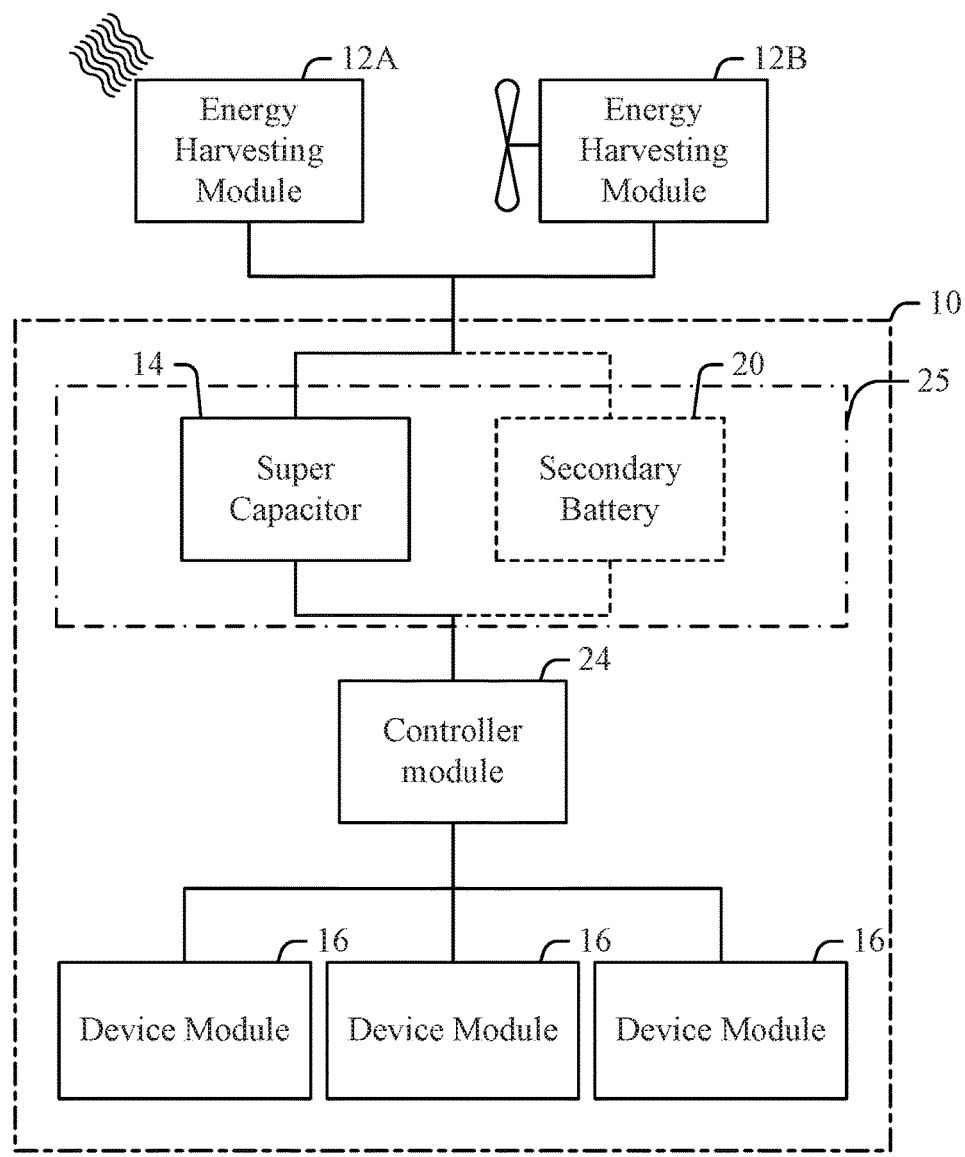
FIG. 1D is a schematic diagram of an IoT device according to an example of the present disclosure having two energy harvesting modules configured to convert energy from different energy sources.

As depicted in FIG. 1D, in at least one example, the IoT device 10 can include at least a first energy harvesting module 12A and a second energy harvesting module 12B. The energy harvesting modules 12A, 12B may be configured to convert energy from the same energy source to increase the energy supplied and/or reduce the size of the energy harvesting modules 12A, 12B. In at least one example, the energy harvesting modules 12A, 12B may be configured to convert energy from different energy sources to increase flexibility in timing and/or energy that can be supplied in recharging of the supercapacitor 14. As depicted in FIG. 1D, the energy harvesting module 12A may convert solar energy and the energy harvesting module 12B may convert wind energy.

The supercapacitor 14 may comprise a wound or stacked capacitor wherein a plurality of electrode plates are arranged in parallel. In this configuration, each electrode sandwich may operate as an Electric Double Layer Capacitor ("EDLC") to maximize the surface area to volume ratio of the supercapacitor 14. In an at least one example, supercapacitor 14 may comprise a hybrid capacitor in addition to or in place of an EDLC. As illustrated, the IoT device 10 includes a single supercapacitor 14. It is contemplated that the IoT device 10 may include a plurality of supercapacitors 14 to increase the amount of power that may be stored by the supercapacitors 14. In this configuration, the plurality of supercapacitors 14 may be arranged in parallel.

The device modules 16 may include, but are not limited to, a plurality of modules includes sensors, transmitters, receivers, data storage modules and other modules for IoT devices configured for long term monitoring. The device module 16 is intended to generally refer to the modules of IoT device 10 and is not intended to be limiting.

As depicted in FIG. 1A, the IoT device 10 may include a secondary battery 20 to provide a hybrid power supply that may supplement the supercapacitor 14. As illustrated in FIG. 1A, in an example, the energy harvesting module 12 may be operably connected to the secondary battery 20 for charging the secondary battery 20, which discharges power to each device module 16. In at least one example, the IoT device 10 may be connectable to a DC source to recharge a depleted secondary battery 20. Alternatively, as illustrated in FIG. 1B, the secondary battery 20 may be a non-rechargeable battery, which may have a longer effective life than an equivalent rechargeable battery. In this configuration, the IoT device 10 may be configured to permit swapping of a depleted secondary battery 20 with a charged secondary battery 20. The controller module 24 may be configured to control power distribution from the secondary battery 20 to each device module 16. In an example, the controller module 24 may be configured to direct power to each device module 16 from the supercapacitor 14 until the supercapacitor 14 is depleted. Upon depletion of the supercapacitor 14, the controller module 24 may be configured to direct power from the secondary battery 20 to each device module 16.

As depicted in FIG. 2A, a hybrid power circuit 25, according to an example, may include a primary power source path 26 and a battery source path 28. The primary power source path 26 may extend from the supercapacitor 14 to the device modules 16. In an example, the energy harvesting module 12 may be operably connected to the primary source path 26. The battery source path 28 may extend from the secondary battery 20 to the device modules 16.

A switching circuit 30 may be operably connected to the power source path 26 and the battery source path 28 and switch between the supercapacitor 14 and the secondary battery 20 as the power source for the device modules 16. The switching circuit 30 may include a comparator 32, a primary path metal-oxide-semiconductor field-effect transistor ("MOSFET") 34a, and a battery path MOSFET 34b for comparing the voltage supplied by the supercapacitor 14 and the secondary battery 20 and performing biased low-leakage switching between the supercapacitor 14 and the secondary battery 20.

As depicted in FIGS. 2A-C, in an example, the primary source path 26 may include a Schottky diode 36a for preventing inadvertent reverse power flows in the primary source path 26. The battery source path 28 may include a Schottky diode 36b for preventing inadvertent reverse power flows in the battery source path 28.

Figure 3:
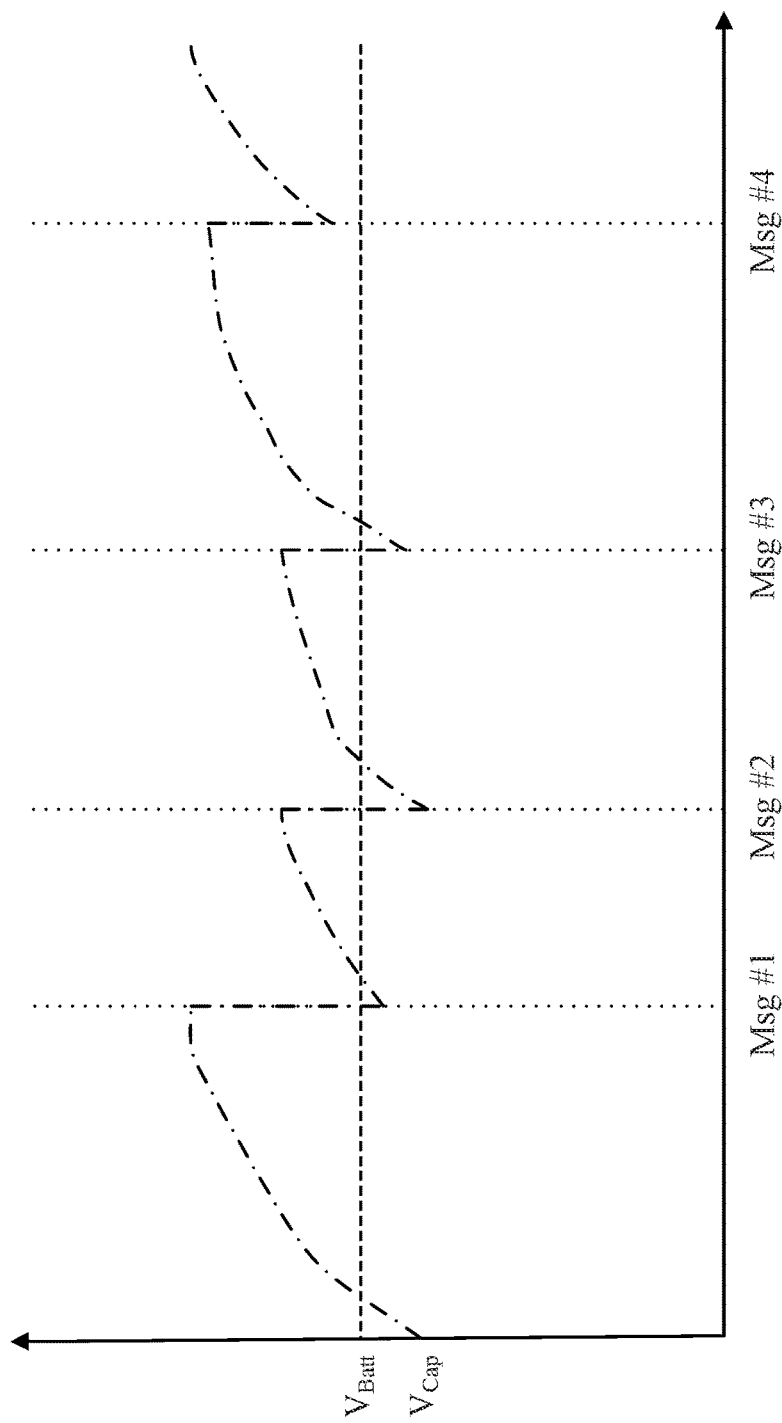
FIG. 3 is a voltage profile of a supercapacitor and a battery according to an example of the present disclosure, wherein an energy harvesting device is continually recharging the supercapacitor.
Figure 4:
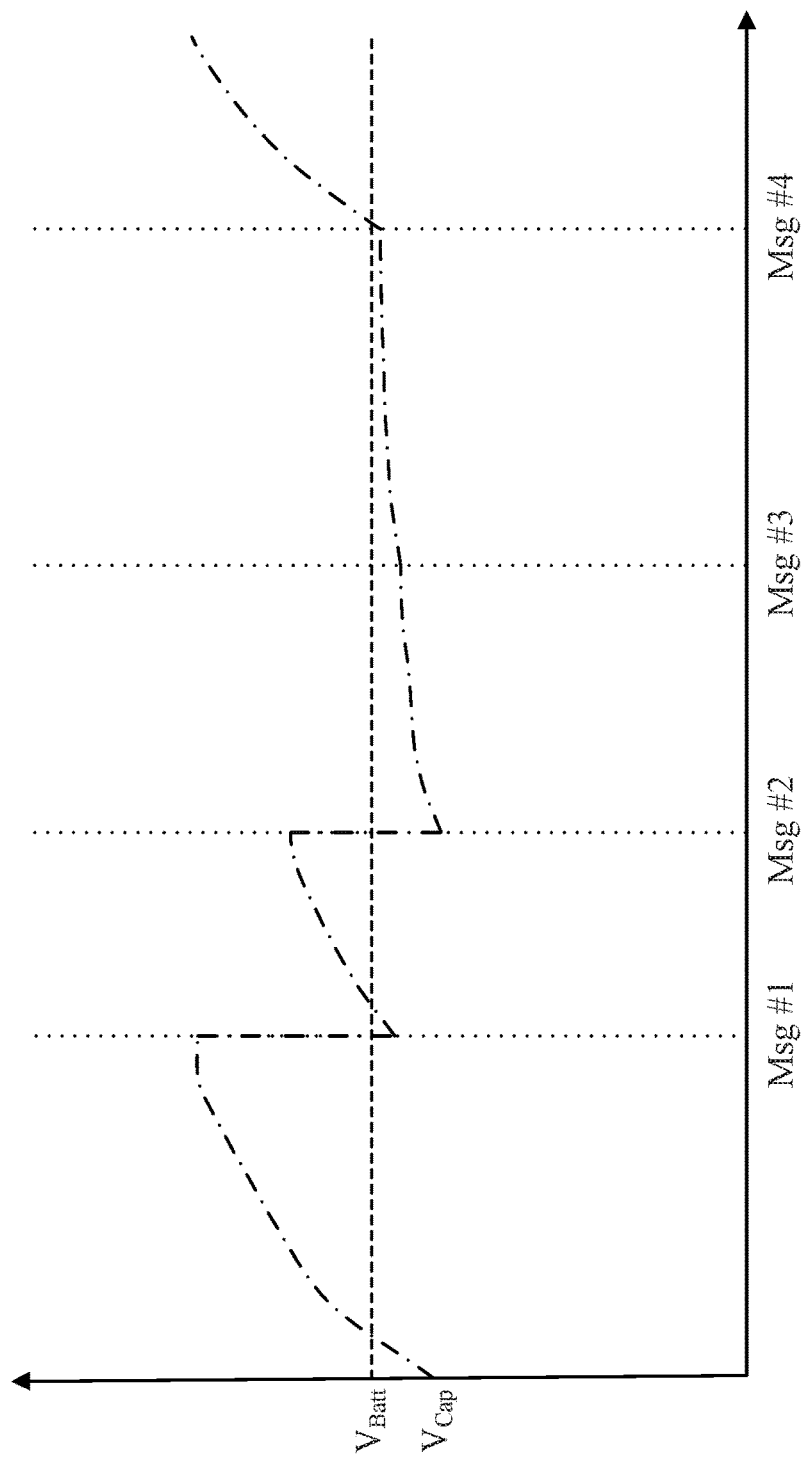
FIG. 4 is a voltage profile of a supercapacitor and a battery according to an example of the present disclosure, wherein recharging the supercapacitor by an energy harvesting device is halted and the battery is supplementing the supercapacitor.

In an example, the output voltage of the supercapacitor 14 is greater than the output voltage of the secondary battery 20 such that the switching circuit 30 is biased toward the supercapacitor 14 and only supplies power from the secondary battery 20 when the supercapacitor 14 is sufficiently depleted. As illustrated in FIGS. 2B and 3, during high energy demand tasks, such as transmission of messages (e.g. Msg #1, Msg #2, Msg #3, Msg #4), the supercapacitor voltage $V_{cap}$ may decrease as the supercapacitor 14 is depleted. The energy harvesting module 12 may recharge the supercapacitor 14 between the high energy demand tasks without or minimally relying on energy discharge from the secondary battery 20, as illustrated by the secondary battery voltage $V_{batt}$ in FIG. 3. This arrangement avoids bursty current usage from the secondary battery 20, which extends the lifetime of the battery. As illustrated in FIGS. 2C and 4, in situations where the energy harvesting module 12 cannot sufficiently recharge the supercapacitor 14 between the high energy tasks (e.g. unable to collect solar energy at night), the secondary battery 20 may provide supplemental energy for performing any intervening high energy demand task (Msg #3).

Figure 5:
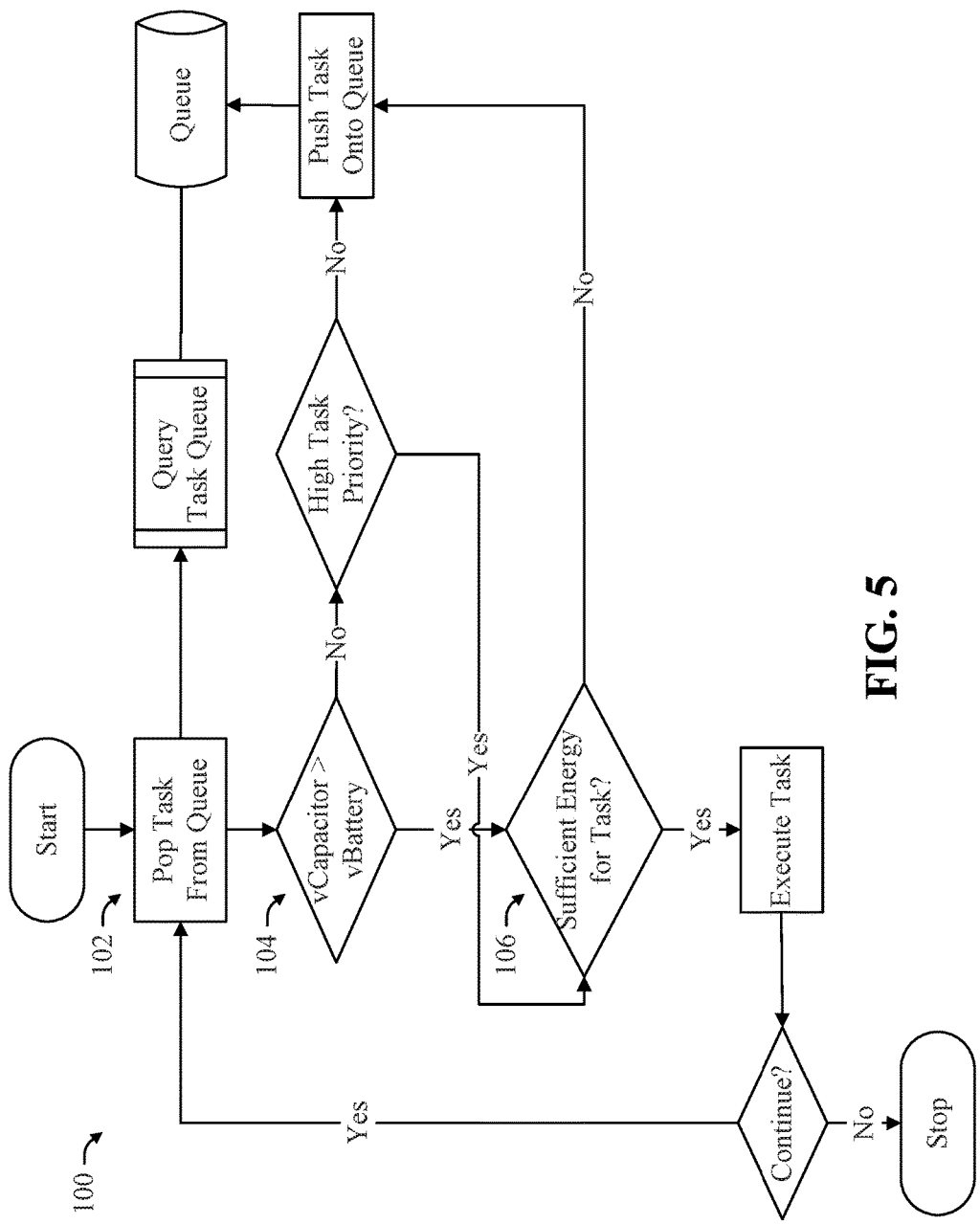
FIG. 5 is a schematic diagram of a process for scheduling tasks according to available energy according to an example of the present disclosure.

As illustrated in FIG. 5, a method for scheduling tasks 100 may include a task selection 102, a voltage comparison 104, and a total energy evaluation 106. This method 100 may be implemented by the controller 24. In an example, the controller 24 may be a microprocessor for receiving instructions from computer readable medium.

The task selection 102 may include querying a task queue of scheduled energy demanding tasks for the device modules 16 including, but not limited to, message transmission; message reception; sensor operation; and data collection. The task queue may comprise a chronological list of energy demanding tasks. For an example, the task queue can include collecting data with the sensor operation and transmitting the corresponding information to a remote receiver. In an example, the task queue can include performing certain energy demanding tasks at certain time frames. The energy demanding tasks and initial queue may be preprogrammed or received via message transmission from a remote controller.

The voltage comparison 104 may include comparing the output voltage $V_{cap}$ of the supercapacitor 14 and the output voltage $V_{batt}$ of the secondary battery 20 to determine if the output voltage $V_{cap}$ exceeds the $V_{batt}$. If the $V_{cap}$ does not exceed the $V_{batt}$, energy demanding task is rescheduled to the queue to delay the energy demanding task until either the supercapacitor 14 is sufficient to perform the energy demanding task. In an example, the energy demanding task can be designated as a high priority task. If designated at a high priority task, the controller may proceed to the total energy evaluation 106 and immediately supply power the available power to perform the energy demanding task even if the output voltage $V_{cap}$ does not exceed the $V_{batt}$. As such, the secondary battery 20 can be discharged in the performance of high priority tasks if the output voltage $V_{cap}$ is insufficient. High priority tasks may include, but are not limited to, message transmissions corresponding to detected emergency situations and detected IoT device 10 malfunctions or damage. High priority tasks may include, but are not limited to, message transmissions corresponding to detected emergency situations and detected IoT device 10 malfunctions or damage. This configuration allows delaying high energy demand, low priority tasks to allow the supercapacitor 14 to be sufficiently charge to be the sole power provider for the scheduled task and avoid any discharge of the secondary battery 20. High energy demand, low priority tasks may include, but are not limited to, ordinary message transmissions and data uploads.

The total energy evaluation 106 may include evaluating the output voltage $V_{cap}$ of the supercapacitor 14 and the output voltage $V_{batt}$ of the secondary battery 20 to determine if sufficient power for performing the schedule energy demanding task may be provided from the supercapacitor 14, the secondary battery 20 and combination thereof. If the supercapacitor 14 and the secondary battery 20 cannot provide sufficient power, the energy demanding task is returned to the queue for performance later when either the supercapacitor 14 and/or the secondary battery 20 is sufficiently recharged. In an example, if the total energy evaluation 106 determines that insufficient power may be provided to perform the energy demanding task, the energy demanding task is returned to the task queue even if the energy demanding task is a high priority task. If sufficient power may be provided by the supercapacitor 14 and/or the secondary battery 20, the scheduled task may be performed if the energy demanding task is a high priority task. In at least one example, if the energy demanding task passes the voltage comparison 104, but insufficient power can be provided by the supercapacitor 14 and/or the secondary batter 20 when evaluated at the total energy evaluation 106.

In an example, if the secondary battery 20 is depleted, the voltage output $V_{cap}$ of the supercapacitor 14 will always exceed the voltage output $V_{batt}$ and the total energy evaluation 106 is the deciding step on whether the scheduled energy demanding task is performed or queued until the supercapacitor 14 is sufficiently charged. This configuration prolongs the effective life of the IoT device 10 by allowing the IoT device 10 to be used after the secondary battery 20 is depleted or the effective charge carried by the secondary battery 20 is reduced by repeated recharging.

Figure 6:
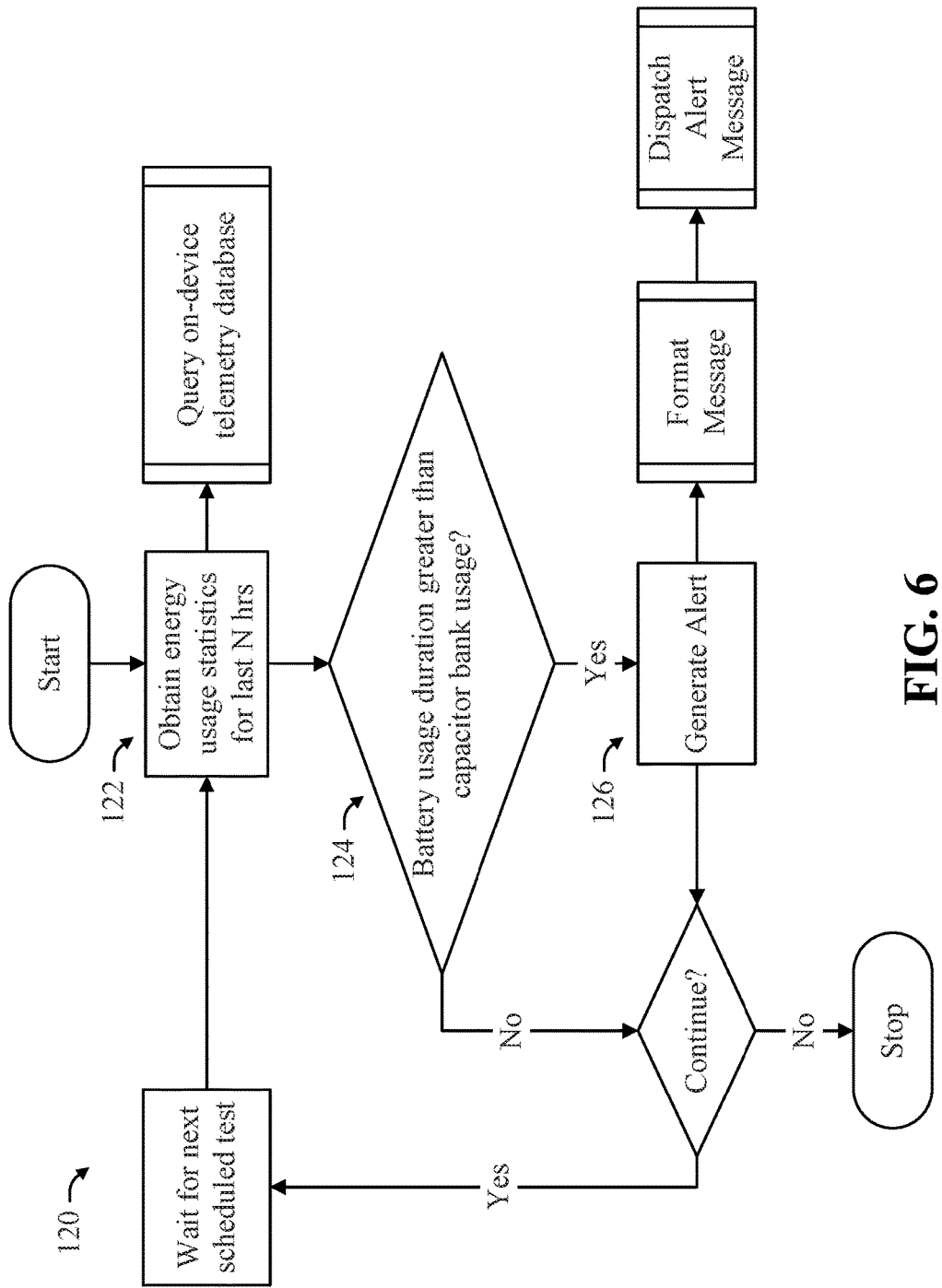
FIG. 6 is a schematic diagram of a process for determining whether maintenance of an IoT device is required according to an example of the present disclosure.

As illustrated in FIG. 6, a method for evaluating secondary battery 20 usage 120 may include recording energy usage statistics 122; usage comparison 124; and alert generation 126. As discussed above, regular recharging of a secondary battery 20 may reduce the effective charge that may be retained by the battery. Accordingly, the method 120 may be used to regularly evaluate the usage of the secondary battery 20 and alert the user is over use of the secondary battery 20 may occur. This method 120 may be implemented by the controller 24. In an example, the controller 24 may be a microprocessor receiving instructions from computer readable medium.

The recording of energy usage statistics 122 may include collecting statistics on the usage of the supercapacitor 14 and the secondary battery 20 over a predetermined period of time. The usage statistics may include, but are not limited to, the amount of power discharged; the duration of power discharge; the frequency of power discharge and the total power discharged during scheduled task.

The usage comparison 124 may include comparing the usage duration of the supercapacitor 14 and the usage duration of the secondary battery 20. If the usage duration of the supercapacitor 14 exceeds the usage duration of the secondary battery 20, the method 120 is discontinued for a predetermined period and restarted after the period has passed. In an example, a different usage statistic may be used, such as, but not limited to, the amount of power discharged; the frequency of power discharge and the total power discharged during scheduled task.

The alert generation 126 may include, upon determination that the usage of the secondary battery 20 exceeds the usage of the supercapacitor 14, generating of an alert. In an example, the alert may be telemetry data transmitted to a remote receiver such that adjustments to the supercapacitor 14 or energy harvesting module 12 may be made if needed. A remote user may evaluate the received telemetry data and vary the scheduled tasks to reduce the energy consumption of the device modules 16. Alternatively, the capacity of the super capacity 14 and/or the energy supply capabilities of the energy harvesting module 12 may be upgraded or adjusted in response to the received telemetry data. In at least one example, the controller 24 may adjust scheduling of tasks 100 to minimize the energy demands on the secondary battery 20.

Figure 7:
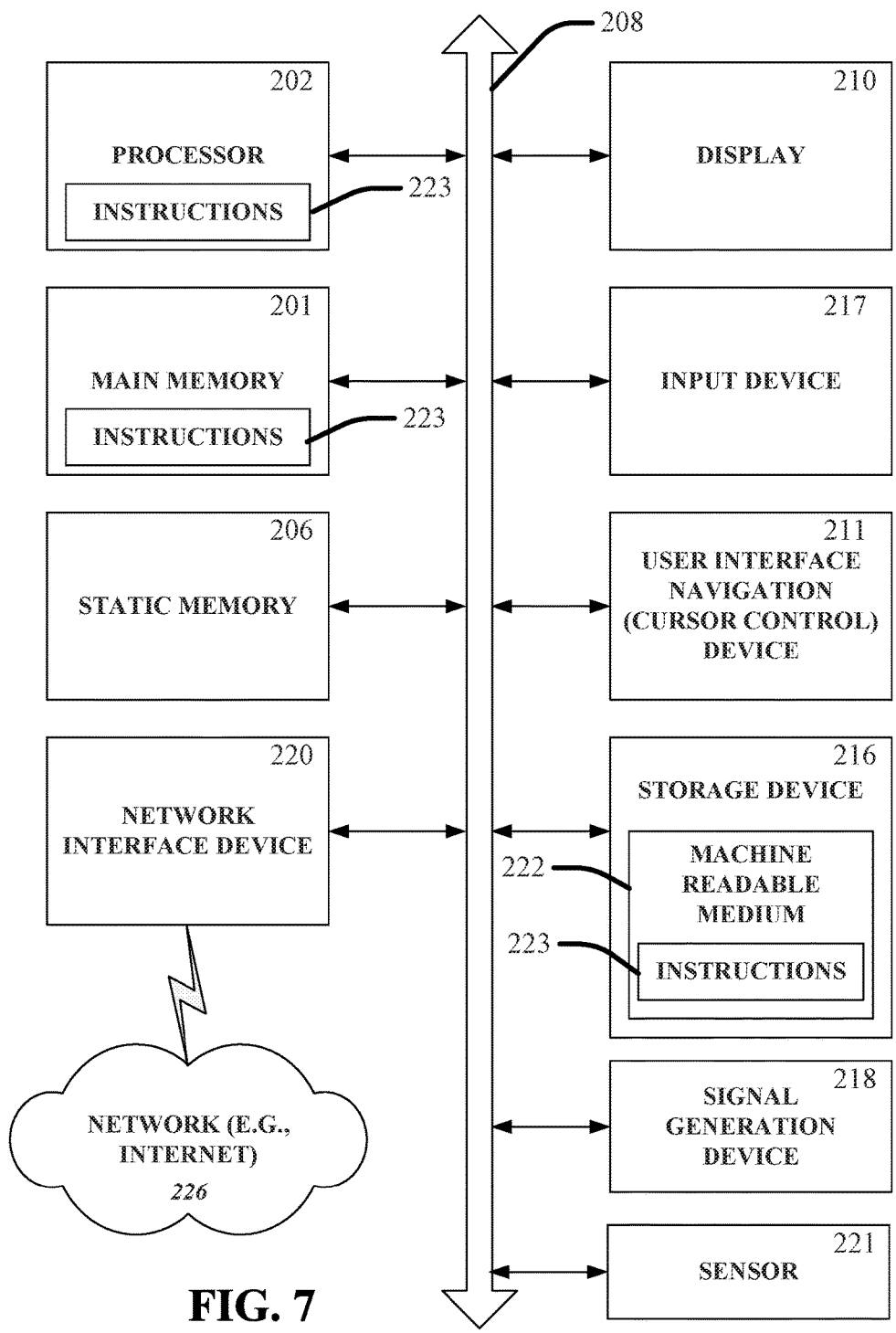
FIG. 7 is a schematic diagram illustrating an example controller module for running any one or more of the methodologies discussed herein.

FIG. 7 is a block diagram illustrating an example controller module 24 upon which any one or more of the methodologies herein discussed may be run. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 200 includes a processor 202 (e.g., a central processing unit (CPU), a graphics processing unit (GPU) or both), a main memory 201 and a static memory 206, which communicate with each other via a bus 208. The computer system 200 may further include a display unit 210, an alphanumeric input device 217 (e.g., a keyboard), and a user interface (UI) navigation device 211 (e.g., a mouse). In one embodiment, the display unit 210, input device 217 and UI navigation device 211 are a touch screen display. The computer system 200 may additionally include a storage device (e.g., drive unit) 216, a signal generation device 218 (e.g., a speaker), a network interface device 220, and one or more sensors 221, such as a global positioning system (GPS) sensor, compass, accelerometer, or other sensor.

The storage device 216 includes a machine-readable medium 222 on which is stored one or more sets of data structures and instructions 223 (e.g., software) embodying or utilized by any one or more of the methodologies or functions described herein. The instructions 223 may also reside, completely or at least partially, within the main memory 201 and/or within the processor 202 during execution thereof by the computer system 200, with the main memory 201 and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 223. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g., Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 223 may further be transmitted or received over a communications network 226 using a transmission medium via the network interface device 220 utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Various Notes & Examples

Example 1 is a system for powering a device module, the system comprising: an energy harvesting module; and a supercapacitor chargeable by the energy harvesting module; wherein the supercapacitor is configured to discharge power to the device module at a supercapacitor voltage.

In Example 2, the subject matter of Example 1 optionally includes, wherein the energy harvesting module is configured to collect energy from an ambient source, the ambient source comprising at least one of solar panels, wind turbines, hydroelectric generators, tidal generators, kinetic induction generators, electromagnetic induction generators, geothermal generators, and heat pump generators.

In Example 3, the subject matter of any one or more of Examples 1-2 optionally include, wherein the energy harvesting module is configured to generate energy from a fuel source, the fuel source comprising at least one of gasoline generators, diesel generators, and natural gas generators.

In Example 4, the subject matter of any one or more of Examples 1-3 optionally include, wherein the system comprises: a supercapacitor bank including a plurality of supercapacitors arranged in parallel; wherein the plurality of supercapacitors are chargeable by the energy harvesting module and configured to discharge power to the device module.

In Example 5, the subject matter of any one or more of Examples 1-4 optionally include, wherein the supercapacitor operates as at least one of an electric double layer capacitor and a hybrid capacitor.

In Example 6, the subject matter of any one or more of Examples 1-5 optionally include, the system comprising: a controller selectively distributing power discharged by the supercapacitor to the device module.

In Example 7, the subject matter of Example 6 optionally includes, wherein the controller is configured to: identify at least one energy demanding task of the device module requiring power from the supercapacitor.

In Example 8, the subject matter of Example 7 optionally includes, wherein the controller is configured to: schedule the at least one energy demanding task such that the supercapacitor discharges power to the device module as the supercapacitor is being charged by the energy harvesting module.

In Example 9, the subject matter of any one or more of Examples 7-8 optionally include, wherein the controller is configured to: schedule a charging period following power discharge from the supercapacitor during the at least one energy demanding task such that the supercapacitor is recharged by the energy harvesting module following the at least one energy demanding task.

In Example 10, the subject matter of any one or more of Examples 6-9 optionally include, wherein the controller is configured to: evaluate energy usage statistics for the supercapacitor, the energy usage statistics include at least one of amount of power discharged, duration of power discharge, frequency of power discharge and total power discharged during the at least one energy demanding task; and generate an alert if the energy usage statistics indicate insufficient power for the at least one energy demanding task.

In Example 11, the subject matter of any one or more of Examples 1-10 optionally include, further comprising: a secondary battery configured to discharge power to the device module at a battery voltage.

In Example 12, the subject matter of Example 11 optionally includes, wherein the supercapacitor and the secondary battery are arranged in parallel.

In Example 13, the subject matter of any one or more of Examples 9-12 optionally include, wherein the supercapacitor voltage is greater than the battery voltage such that power output to the device module is biased to the supercapacitor until the supercapacitor is discharged.

In Example 14, the subject matter of any one or more of Examples 11-13 optionally include, further comprising: a controller selectively distributing power discharged by at least one of the supercapacitor and the secondary battery to the device module.

In Example 15, the subject matter of Example 14 optionally includes, wherein the controller is configured to: compare the supercapacitor voltage to the battery voltage; and discharge power from the supercapacitor to the device module when the supercapacitor voltage exceeds the battery voltage.

In Example 16, the subject matter of any one or more of Examples 14-15 optionally include, wherein the controller is configured to: evaluate supercapacitor voltage and the battery voltage to determine an available charge of the supercapacitor and the secondary battery; and discharge power from the supercapacitor and the secondary battery when the available charge is sufficient to power the device module.

In Example 17, the subject matter of any one or more of Examples 14-16 optionally include, wherein the controller is configured to: identify at least one energy demanding task of the device module; and selectively discharge power from at least one of the supercapacitor and the secondary battery.

In Example 18, the subject matter of Example 17 optionally includes, wherein the controller is configured to: compare the supercapacitor voltage to the battery voltage; and delay the at least one energy demanding task when the battery voltage exceeds the supercapacitor voltage until the supercapacitor is recharged by the energy harvesting module.

In Example 19, the subject matter of any one or more of Examples 17-18 optionally include, wherein the controller is configured to: compare the supercapacitor voltage to the battery voltage; and schedule the at least one energy demanding task such that the supercapacitor discharges power to the device module as the supercapacitor is being charged by the energy harvesting module when the battery voltage exceeds the supercapacitor voltage.

In Example 20, the subject matter of any one or more of Examples 17-19 optionally include, wherein the controller is configured to: schedule a charging period following power discharge from the supercapacitor during the at least one energy demanding task such that the supercapacitor is recharged by the energy harvesting module following the at least one energy demanding task.

In Example 21, the subject matter of any one or more of Examples 17-20 optionally include, wherein the controller is configured to: evaluate supercapacitor voltage and the battery voltage to determine an available charge of the supercapacitor and the secondary battery; and delay the at least one energy demanding task when the available charge is insufficient to perform the at least one energy demanding task.

In Example 22, the subject matter of any one or more of Examples 14-21 optionally include, wherein the controller is configured to: evaluate energy usage statistics for the supercapacitor and the secondary battery, the energy usage statistics include at least one of amount of power discharged, duration of power discharge, frequency of power discharge and total power discharged during the at least one energy demanding task.

In Example 23, the subject matter of Example 22 optionally includes, wherein the controller is configured to: generate an alert if the collected energy usage statistics indicate that usage of the secondary battery exceeds usage of the supercapacitor.

In Example 24, the subject matter of Example 23 optionally includes, further comprising: a transmitter module; and a remote receiver; wherein the alert comprises telemetry data transmittable to the remote receiver by the transmitter module for evaluating the received telemetry data.

In Example 25, the subject matter of any one or more of Examples 14-24 optionally include, further comprising: a receiver module; wherein the controller is configured to receive instructions via the receiver module to modify power discharge from at least one the supercapacitor and the secondary battery.

Example 26 is a method for powering a device module, the method comprising: generating energy with an energy harvesting module; charging a supercapacitor with energy generated by the energy harvesting module; and discharging power from the supercapacitor to the device module at a supercapacitor voltage.

In Example 27, the subject matter of Example 26 optionally includes, wherein the energy harvesting module generates energy by collecting energy from an ambient source and comprises at least one of solar panels, wind turbines, hydroelectric generators, tidal generators, kinetic induction generators, electromagnetic induction generators, geothermal generators, and heat pump generators.

In Example 28, the subject matter of any one or more of Examples 26-27 optionally include, wherein the energy harvesting module generates energy from a fuel source selected and comprises at least one of gasoline generators, diesel generators, and natural gas generators.

In Example 29, the subject matter of any one or more of Examples 26-28 optionally include, wherein the energy harvesting module charges a supercapacitor bank including a plurality of supercapacitors arranged in parallel, the plurality of supercapacitors are configured to discharge power to the device module.

In Example 30, the subject matter of any one or more of Examples 26-29 optionally include, wherein the supercapacitor operates as at least one of an electric double layer capacitor and a hybrid capacitor.

In Example 31, the subject matter of any one or more of Examples 26-30 optionally include, further comprising: selectively distributing power discharge from the supercapacitor according to power usage of the device module.

In Example 32, the subject matter of any one or more of Examples 26-31 optionally include, further comprising: identifying at least one energy demanding task of the device module requiring power from the supercapacitor.

In Example 33, the subject matter of Example 32 optionally includes, further comprising: scheduling the at least one energy demanding task such that the supercapacitor discharges power to the device module as the supercapacitor is being charged by the energy harvesting module.

In Example 34, the subject matter of any one or more of Examples 32-33 optionally include, further comprising: scheduling a charging period following power discharge from the supercapacitor during the at least one energy demanding task such that the supercapacitor is recharged by the energy harvesting module following the at least one energy demanding task.

In Example 35, the subject matter of any one or more of Examples 32-34 optionally include, further comprising: evaluating energy usage statistics for the supercapacitor, wherein the energy usage statistics include at least one of amount of power discharged, duration of power discharge, frequency of power discharge and total power discharged during the at least one energy demanding task; and generating an alert if the energy usage statistics indicate insufficient power for the at least one energy demanding task.

In Example 36, the subject matter of any one or more of Examples 26-35 optionally include, further comprising: discharging power from a secondary battery to the device module at a battery voltage.

In Example 37, the subject matter of Example 36 optionally includes, wherein the supercapacitor and the secondary battery are arranged in parallel.

In Example 38, the subject matter of Example 37 optionally includes, wherein the supercapacitor voltage is greater than the battery voltage such that power output to the device module is biased to the supercapacitor until the supercapacitor is discharged.

In Example 39, the subject matter of any one or more of Examples 36-38 optionally include, further comprising: selectively distributing power discharge from at least one of the supercapacitor and the secondary battery according to power usage of the device module.

In Example 40, the subject matter of any one or more of Examples 36-39 optionally include, further comprising: comparing the supercapacitor voltage to the battery voltage; and discharging power from the supercapacitor to the device module when the supercapacitor voltage exceeds the battery voltage.

In Example 41, the subject matter of any one or more of Examples 36-40 optionally include, further comprising: evaluating supercapacitor voltage and the battery voltage to determine an available charge of the supercapacitor and the secondary battery; and discharging power from the supercapacitor and the secondary battery when the available charge is sufficient to power the device module.

In Example 42, the subject matter of any one or more of Examples 36-41 optionally include, further comprising: identifying at least one energy demanding task of the device module; and selectively discharging power from at least one of the supercapacitor and the secondary battery.

In Example 43, the subject matter of Example 42 optionally includes, further comprising: comparing the supercapacitor voltage to the battery voltage; and delaying the at least one energy demanding task when the battery voltage exceeds the supercapacitor voltage until the supercapacitor is recharged by the energy harvesting module.

In Example 44, the subject matter of any one or more of Examples 42-43 optionally include further comprising: comparing the supercapacitor voltage to the battery voltage; and scheduling the at least one energy demanding task such that the supercapacitor discharges power to the device module as the supercapacitor is being charged by the energy harvesting module when the battery voltage exceeds the supercapacitor voltage.

In Example 45, the subject matter of any one or more of Examples 42-44 optionally include, further comprising: scheduling a charging period following power discharge from the supercapacitor during the at least one energy demanding task such that the supercapacitor is recharged by the energy harvesting module following the at least one energy demanding task.

In Example 46, the subject matter of any one or more of Examples 42-45 optionally include, further comprising: evaluating supercapacitor voltage and the battery voltage to determine an available charge of the supercapacitor and the secondary battery; and delaying the at least one energy demanding task when the available charge is insufficient to perform the at least one energy demanding task.

In Example 47, the subject matter of any one or more of Examples 36-46 optionally include, further comprising: evaluating energy usage statistics for the supercapacitor and the secondary battery, the energy usage statistics include at least one of amount of power discharged, duration of power discharge, frequency of power discharge and total power discharged during the at least one energy demanding task.

In Example 48, the subject matter of Example 47 optionally includes, further comprising: generating an alert if the collected energy usage statistics indicate that usage of the secondary battery exceeds usage of the supercapacitor.

In Example 49, the subject matter of Example 48 optionally includes, further comprising: transmitting the alert to a remote receiver by a transmitter module, wherein the alert comprises telemetry data; and evaluating the received telemetry data.

In Example 50, the subject matter of any one or more of Examples 36-49 optionally include, further comprising: receiving instructions to modify power discharge from the supercapacitor and the secondary battery.

Example 51 is an apparatus comprising means for performing any of the methods of Examples 26-50.

Example 52 is at least one machine-readable medium including instructions, which when executed by a machine, cause the machine to perform operations of any of the methods of Examples 26-50.

Example 53 is an apparatus for powering a device module, the apparatus comprising: means for generating energy with an energy harvesting module; means for charging a supercapacitor with energy generated by the energy harvesting module; and means for discharging power from the supercapacitor to the device module at a supercapacitor voltage.

In Example 54, the subject matter of Example 53 optionally includes, wherein the energy harvesting module is configured to collect energy from an ambient source and comprises at least one of solar panels, wind turbines, hydroelectric generators, tidal generators, kinetic induction generators, electromagnetic induction generators, geothermal generators, and heat pump generators.

In Example 55, the subject matter of any one or more of Examples 53-54 optionally include, wherein the energy harvesting module is configured to generate energy from a fuel source and comprises at least one of gasoline generators, diesel generators, and natural gas generators.

In Example 56, the subject matter of any one or more of Examples 53-55 optionally include, wherein the apparatus comprises: a supercapacitor bank including a plurality of supercapacitors arranged in parallel; wherein the plurality of supercapacitors are chargeable by the energy harvesting module and configured to discharge power to the device module.

In Example 57, the subject matter of any one or more of Examples 53-56 optionally include, wherein the supercapacitor operates as at least one of an electric double layer capacitor and a hybrid capacitor.

In Example 58, the subject matter of any one or more of Examples 53-57 optionally include, further comprising: means for selectively distributing power discharge from the supercapacitor according to power usage of the device module.

In Example 59, the subject matter of Example 58 optionally includes, further comprising: means for identifying at least one energy demanding task of the device module requiring power from the supercapacitor.

In Example 60, the subject matter of any one or more of Examples 58-59 optionally include, further comprising: means for scheduling the at least one energy demanding task such that the supercapacitor discharges power to the device module as the supercapacitor is being charged by the energy harvesting module.

In Example 61, the subject matter of any one or more of Examples 58-60 optionally include, further comprising: means for scheduling a charging period following power discharge from the supercapacitor during the at least one energy demanding task such that the supercapacitor is recharged by the energy harvesting module following the at least one energy demanding task.

In Example 62, the subject matter of any one or more of Examples 58-61 optionally include, further comprising: means evaluating energy usage statistics for the supercapacitor, the energy usage statistics include at least one of amount of power discharged, duration of power discharge, frequency of power discharge and total power discharged during the at least one energy demanding task; and means for generating an alert if the energy usage statistics indicate insufficient power for the at least one energy demanding task.

In Example 63, the subject matter of any one or more of Examples 53-62 optionally include, further comprising: means for discharging power from a secondary battery to the device module at a battery voltage.

In Example 64, the subject matter of Example 63 optionally includes, wherein the supercapacitor voltage is greater than the battery voltage such that power output to the device module is biased to the supercapacitor until the supercapacitor is discharged.

In Example 65, the subject matter of Example 64 optionally includes, wherein the supercapacitor voltage is greater than the battery voltage to bias power output to the device module to the supercapacitor until the supercapacitor is discharged.

In Example 66, the subject matter of any one or more of Examples 63-65 optionally include, further comprising: means for selectively distributing power discharge from at least one of the supercapacitor and the secondary battery according to power usage of the device module.

In Example 67, the subject matter of Example 66 optionally includes, further comprising: means for comparing the supercapacitor voltage to the battery voltage; and means for discharging power from the supercapacitor to the device module when the supercapacitor voltage exceeds the battery voltage.

In Example 68, the subject matter of any one or more of Examples 66-67 optionally include, further comprising: means for comparing the supercapacitor voltage to the battery voltage; and means for discharging power from the supercapacitor and the secondary battery when the available charge is sufficient to power the device module.

In Example 69, the subject matter of any one or more of Examples 66-68 optionally include, further comprising: means for identifying at least one energy demanding task of the device module; and means for selectively discharging power from at least one of the supercapacitor and the secondary battery.

In Example 70, the subject matter of Example 69 optionally includes, further comprising: means for comparing the supercapacitor voltage to the battery voltage; and means for delaying the at least one energy demanding task when the battery voltage exceeds the supercapacitor voltage until the supercapacitor is recharged by the energy harvesting module.

In Example 71, the subject matter of any one or more of Examples 69-70 optionally include, further comprising: means for comparing the supercapacitor voltage to the battery voltage; and means for scheduling the at least one energy demanding task such that the supercapacitor discharges power to the device module as the supercapacitor is being charged by the energy harvesting module when the battery voltage exceeds the supercapacitor voltage.

In Example 72, the subject matter of any one or more of Examples 69-71 optionally include, further comprising: means for scheduling a charging period following power discharge from the supercapacitor during the at least one energy demanding task such that the supercapacitor is recharged by the energy harvesting module following the at least one energy demanding task.

In Example 73, the subject matter of any one or more of Examples 69-72 optionally include, further comprising: means for evaluating supercapacitor voltage and the battery voltage to determine an available charge of the supercapacitor and the secondary battery; and means for delaying the at least one energy demanding task when the available charge is insufficient to perform the at least one energy demanding task.

In Example 74, the subject matter of any one or more of Examples 66-73 optionally include, wherein the controller is configured to: means for evaluating energy usage statistics for the supercapacitor and the secondary battery, the energy usage statistics include at least one of amount of power discharged, duration of power discharge, frequency of power discharge and total power discharged during the at least one energy demanding task.

In Example 75, the subject matter of Example 74 optionally includes, wherein the controller is configured to: means for generating an alert if the collected energy usage statistics indicate that usage of the secondary battery exceeds usage of the supercapacitor.

In Example 76, the subject matter of Example 75 optionally includes, further comprising: means for transmitting the alert to a remote receiver by a transmitter module, wherein the alert comprises telemetry data; and means for evaluating the received telemetry data.

In Example 77, the subject matter of Example 76 optionally includes, further comprising: means for receiving instructions to modify power discharge from the supercapacitor and the secondary battery.

Example 78 is a system for powering a device module, the system comprising: a controller configured to read computer readable instructions and configured to control powering of the device module.

In Example 79, the subject matter of Example 78 optionally includes, wherein the energy harvesting module is configured to collect energy from an ambient source and comprises at least one of solar panels, wind turbines, hydroelectric generators, tidal generators, kinetic induction generators, electromagnetic induction generators, geothermal generators, and heat pump generators.

In Example 80, the subject matter of any one or more of Examples 78-79 optionally include, wherein the energy harvesting module is configured to generate energy from a fuel source and comprises at least one of gasoline generators, diesel generators, and natural gas generators.

In Example 81, the subject matter of any one or more of Examples 78-80 optionally include, wherein the system comprises: a supercapacitor bank including a plurality of supercapacitors arranged in parallel; wherein the plurality of supercapacitors are chargeable by the energy harvesting module and configured to discharge power to the device module.

In Example 82, the subject matter of any one or more of Examples 78-81 optionally include, wherein the supercapacitor operates as at least one of an electric double layer capacitor and a hybrid capacitor.

In Example 83, the subject matter of any one or more of Examples 78-82 optionally include, wherein the instructions for controlling powering of a device module comprises instructions for: selectively distributing power discharge from the supercapacitor according to power usage of the device module.

In Example 84, the subject matter of Example 83 optionally includes, wherein the instructions for controlling powering of a device module comprises instructions for: identifying at least one energy demanding task of the device module requiring power from the supercapacitor.

In Example 85, the subject matter of Example 84 optionally includes, wherein the instructions for controlling powering of a device module comprises instructions for: scheduling the at least one energy demanding task such that the supercapacitor discharges power to the device module as the supercapacitor is being charged by the energy harvesting module.

In Example 86, the subject matter of any one or more of Examples 84-85 optionally include, wherein the instructions for controlling powering of a device module comprises instructions for: scheduling a charging period following power discharge from the supercapacitor during the at least one energy demanding task such that the supercapacitor is recharged by the energy harvesting module following the at least one energy demanding task.

In Example 87, the subject matter of any one or more of Examples 83-86 optionally include, wherein the instructions for controlling powering of a device module comprises instructions for: evaluating energy usage statistics for the supercapacitor, the energy usage statistics include at least one of amount of power discharged, duration of power discharge, frequency of power discharge and total power discharged during the at least one energy demanding task; and generating an alert if the energy usage statistics indicate insufficient power for the at least one energy demanding task.

In Example 88, the subject matter of any one or more of Examples 78-87 optionally include, further comprising: discharging power from a secondary battery to the device module at a battery voltage.

In Example 89, the subject matter of Example 88 optionally includes, wherein the supercapacitor and the secondary battery are arranged in parallel.

In Example 90, the subject matter of Example 89 optionally includes, wherein the supercapacitor voltage is greater than the battery voltage such that power output to the device module is biased to the supercapacitor until the supercapacitor is discharged.

In Example 91, the subject matter of any one or more of Examples 88-90 optionally include, wherein the instructions for controlling powering of a device module comprises instructions for: selectively distributing power discharge from at least one of the supercapacitor and the secondary battery according to power usage of the device module.

In Example 92, the subject matter of Example 91 optionally includes, wherein the instructions for controlling powering of a device module comprises instructions for: comparing the supercapacitor voltage to the battery voltage; and discharging power from the supercapacitor to the device module when the supercapacitor voltage exceeds the battery voltage.

In Example 93, the subject matter of any one or more of Examples 91-92 optionally include, wherein the instructions for controlling powering of a device module comprises instructions for: evaluating supercapacitor voltage and the battery voltage to determine an available charge of the supercapacitor and the secondary battery; and discharging power from the supercapacitor and the secondary battery when the available charge is sufficient to power the device module.

In Example 94, the subject matter of any one or more of Examples 91-93 optionally include, wherein the instructions for controlling powering of a device module comprises instructions for: identifying at least one energy demanding task of the device module; and selectively discharging power from at least one of the supercapacitor and the secondary battery.

In Example 95, the subject matter of Example 94 optionally includes, wherein the instructions for controlling powering of a device module comprises instructions for: comparing the supercapacitor voltage to the battery voltage; and delaying the at least one energy demanding task when the battery voltage exceeds the supercapacitor voltage until the supercapacitor is recharged by the energy harvesting module.

In Example 96, the subject matter of any one or more of Examples 94-95 optionally include, wherein the instructions for controlling powering of a device module comprises instructions for: comparing the supercapacitor voltage to the battery voltage; and scheduling the at least one energy demanding task such that the supercapacitor discharges power to the device module as the supercapacitor is being charged by the energy harvesting module when the battery voltage exceeds the supercapacitor voltage.

In Example 97, the subject matter of any one or more of Examples 94-96 optionally include, wherein the instructions for controlling powering of a device module comprises instructions for: scheduling a charging period following power discharge from the supercapacitor during the at least one energy demanding task such that the supercapacitor is recharged by the energy harvesting module following the at least one energy demanding task.

In Example 98, the subject matter of any one or more of Examples 94-97 optionally include, wherein the instructions for controlling powering of a device module comprises instructions for: evaluating supercapacitor voltage and the battery voltage to determine an available charge of the supercapacitor and the secondary battery; and delaying the at least one energy demanding task when the available charge is insufficient to perform the at least one energy demanding task.

In Example 99, the subject matter of any one or more of Examples 91-98 optionally include, wherein the instructions for controlling powering of a device module comprises instructions for: evaluating energy usage statistics for the supercapacitor and the secondary battery, the energy usage statistics include at least one of amount of power discharged, duration of power discharge, frequency of power discharge and total power discharged during the at least one energy demanding task.

In Example 100, the subject matter of Example 99 optionally includes, wherein the instructions for controlling powering of a device module comprises instructions for: generating an alert if the collected energy usage statistics indicate that usage of the secondary battery exceeds usage of the supercapacitor.

In Example 101, the subject matter of Example 100 optionally includes, wherein the instructions for controlling powering of a device module comprises instructions for: transmitting the alert to a remote receiver by a transmitter module, wherein the alert comprises telemetry data; and evaluating the received telemetry data.

In Example 102, the subject matter of any one or more of Examples 91-101 optionally include, wherein the instructions for controlling powering of a device module comprises instructions for: receiving instructions to modify power discharge from the supercapacitor and the secondary battery.

Each of these non-limiting examples may stand on its own, or may be combined in any permutation or combination with any one or more of the other examples.

The above detailed description includes references to the accompanying drawings, which form a part of the detailed description. The drawings show, by way of illustration, specific embodiments in which the present subject matter may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the present subject matter should be determined with reference to the appended claims, along with the full scope of equivalents to which such claims are entitled.

What is claimed is:

1. A system for powering a device module, the system comprising:
    an energy harvesting module;
    a supercapacitor chargeable by the energy harvesting module and configured to discharge power to the device module at a supercapacitor voltage;
    a secondary battery configured to discharge power to the device module at a battery voltage;
    a switching circuit configured to selectively discharge power from the supercapacitor during high energy demand tasks and discharge power from the secondary battery during periods between high energy demand tasks; and
    a controller selectively distributing power discharged by at least one of the supercapacitor and the secondary battery to the device module, wherein the controller is configured to:
        evaluate energy usage statistics for the supercapacitor and the secondary battery, the energy usage statistics include at least one of amount of power discharged, duration of power discharge, frequency of power discharge and total power discharged during the at least one energy demanding task; and
        generate an alert if the collected energy usage statistics indicate that usage of the secondary battery exceeds usage of the supercapacitor.

2. The system of claim 1, wherein the energy harvesting module is configured to collect energy from an ambient source, the ambient source comprising at least one of solar panels, wind turbines, hydroelectric generators, tidal generators, kinetic induction generators, electromagnetic induction generators, geothermal generators, and heat pump generators.

3. The system of claim 1, wherein the energy harvesting module is configured to generate energy from a fuel source, the fuel source comprising at least one of gasoline generators, diesel generators, and natural gas generators.

4. The system of claim 1, wherein the system comprises:
    a supercapacitor bank including a plurality of supercapacitors arranged in parallel;
    wherein the plurality of supercapacitors are chargeable by the energy harvesting module and configured to discharge power to the device module.

5. The system of claim 1, wherein the supercapacitor operates as at least one of an electric double layer capacitor and a hybrid capacitor.

6. The system of claim 1, wherein the supercapacitor and the secondary battery are arranged in parallel.

7. The system of claim 6, wherein the supercapacitor voltage is greater than the battery voltage such that power output to the device module is biased to the supercapacitor until the supercapacitor is discharged.

8. The system of claim 1, further comprising:
    a transmitter module; and
    a remote receiver;
    wherein the alert comprises telemetry data transmittable to the remote receiver by the transmitter module for evaluating the received telemetry data.

9. The system of claim 1, further comprising:
    a receiver module;
    wherein the controller is configured to receive instructions via the receiver module to modify power discharge from at least one the supercapacitor and the secondary battery.

10. A method for powering a device module, the method comprising:
    generating energy with an energy harvesting module;
    charging a supercapacitor with energy generated by the energy harvesting module;
    discharging power from the supercapacitor to the device module at a supercapacitor voltage during high energy demand tasks;
    discharging power from a secondary battery to the device module at a battery voltage during periods between high energy demand tasks;

comparing the supercapacitor voltage to the battery voltage; and delaying the at least one energy demanding task when the battery voltage exceeds the supercapacitor voltage until the supercapacitor is recharged by the energy harvesting module.

11. The method of claim 10, further comprising:

identifying at least one energy demanding task of the device module requiring power from the supercapacitor.

12. The method of claim 11, further comprising:

scheduling the at least one energy demanding task such that the supercapacitor discharges power to the device module as the supercapacitor is being charged by the energy harvesting module.

13. The method of claim 11, further comprising:

scheduling a charging period following power discharge from the supercapacitor during the at least one energy demanding task such that the supercapacitor is recharged by the energy harvesting module following the at least one energy demanding task.

14. The method of claim 10, further comprising:

comparing the supercapacitor voltage to the battery voltage; and discharging power from the supercapacitor to the device module when the supercapacitor voltage exceeds the battery voltage.

15. The method of claim 10, further comprising:

evaluating supercapacitor voltage and the battery voltage to determine an available charge of the supercapacitor and the secondary battery; and discharging power from the supercapacitor and the secondary battery when the available charge is sufficient to power the device module.

16. The method of claim 10, further comprising:

comparing the supercapacitor voltage to the battery voltage; and scheduling the at least one energy demanding task such that the supercapacitor discharges power to the device module as the supercapacitor is being charged by the energy harvesting module when the battery voltage exceeds the supercapacitor voltage.

* * * * *